United States Patent
Rusch et al.

(10) Patent No.: US 11,982,332 B2
(45) Date of Patent: May 14, 2024

(54) CENTRIFUGAL PENDULUM HAVING A ROLLER TRACK PROJECTING AXIALLY OUTWARD, AND TORQUE TRANSMISSION DEVICE

(71) Applicant: Schaeffler Technologies AG & Co. KG, Herzogenaurach (DE)

(72) Inventors: Alain Rusch, Gambsheim (FR); Martin Häßler, Graben-Neudorf (DE); Martin Loth, Bühl (DE); Laurent Theriot, Strasbourg (FR)

(73) Assignee: Schaeffler Technologies AG &Co. KG, Herzogenaurach (DE)

( * ) Notice: Subject to any disclaimer, the term of this patent is extended or adjusted under 35 U.S.C. 154(b) by 95 days.

(21) Appl. No.: 17/802,175

(22) PCT Filed: Jan. 15, 2021

(86) PCT No.: PCT/DE2021/100044
§ 371 (c)(1),
(2) Date: Aug. 25, 2022

(87) PCT Pub. No.: WO2021/170168
PCT Pub. Date: Sep. 2, 2021

(65) Prior Publication Data
US 2023/0358294 A1    Nov. 9, 2023

(30) Foreign Application Priority Data
Feb. 27, 2020 (DE) ................ 10 2020 105 174.3

(51) Int. Cl.
*F16F 15/14* (2006.01)

(52) U.S. Cl.
CPC ........ *F16F 15/145* (2013.01); *F16F 2222/08* (2013.01); *F16F 2232/02* (2013.01); *F16F 2236/08* (2013.01)

(58) Field of Classification Search
CPC ... F16F 15/145; F16F 2232/02; F16F 2222/08
See application file for complete search history.

(56) References Cited

U.S. PATENT DOCUMENTS 6,280,330 B1 *  8/2001  Eckel ............... F16F 15/1435
                                            464/3
6,345,552 B1 *  2/2002  Rohrig ............ F16F 15/1435
                                            74/574.4

(Continued)

FOREIGN PATENT DOCUMENTS

| CN | 104271982 A | 1/2015 |
| CN | 104302945 A | 1/2015 |
| CN | 107477146 A | 12/2017 |

(Continued)

*Primary Examiner* — Thomas C Diaz

(57) ABSTRACT

A centrifugal pendulum for a motor vehicle drivetrain includes a carrier, a pendulum mass, mounting for pivoting relative to the carrier, and a roller body. The carrier has a carrier roller track and the pendulum mass has a pendulum mass roller track. The roller body has a first rolling region arranged in the carrier roller track and a second rolling region arranged in the pendulum mass roller track. The carrier roller track is formed at least partially by an axially formed sheet-metal portion having a free edge, and the free edge faces away from the pendulum mass.

18 Claims, 5 Drawing Sheets

(56) References Cited

U.S. PATENT DOCUMENTS

| | | | | |
|---|---|---|---|---|
| 10,584,763 | B2 * | 3/2020 | Dinger | F16F 15/145 |
| 2016/0208886 | A1 | 7/2016 | Friedrichshafen | |

FOREIGN PATENT DOCUMENTS

| | | |
|---|---|---|
| CN | 109642637 A | 4/2019 |
| CN | 109891120 A | 6/2019 |
| DE | 10005545 A1 | 8/2001 |
| DE | 10005547 A1 | 8/2001 |
| DE | 102016214469 A1 | 2/2018 |
| DE | 102019106343 A1 | 10/2019 |
| JP | 2000046113 A | 2/2000 |
| JP | 2000046117 A | 2/2000 |
| JP | 2011522185 A | 7/2011 |
| WO | 2015058766 A1 | 4/2015 |
| WO | 2015149790 A1 | 10/2015 |
| WO | 2018036591 A1 | 3/2018 |
| WO | 2018145658 A1 | 8/2018 |

* cited by examiner

CENTRIFUGAL PENDULUM HAVING A ROLLER TRACK PROJECTING AXIALLY OUTWARD, AND TORQUE TRANSMISSION DEVICE

CROSS-REFERENCE TO RELATED APPLICATIONS

This application is the United States National Phase of PCT Appln. No. PCT/DE2021/100044 filed Jan. 15, 2021, which claims priority to German Application No. DE102020105174.3 filed Feb. 27, 2020, the entire disclosures of which are incorporated by reference herein.

TECHNICAL FIELD

The present disclosure relates to a centrifugal pendulum for a motor vehicle drivetrain, e.g., for use in or on a clutch of said drivetrain, including a carrier and a pendulum mass which is mounted for pivoting relative to the carrier by means of at least one roller body. A first rolling region of the at least one roller body is accommodated in a (first) roller track of the carrier and a second rolling region of the at least one roller body is accommodated in a (second) roller track of the pendulum mass. The present disclosure further relates to a torque transmission device having said centrifugal pendulum.

BACKGROUND

Generic centrifugal pendulums are already sufficiently known in the prior art. In this context, for example, an application filed with the German Patent and Trademark Office under file number DE 10 2013 221 607.6 discloses a centrifugal pendulum with two pendulum masses, which are guided by means of pendulum rollers on a carrier element or on two carrier elements along raceways.

However, the designs known from the prior art have been found to be disadvantageous in that the roller tracks of the previously implemented variants are only able to withstand the high loads which occur during operation if they are reworked at relatively high cost. In addition, when forming the roller tracks, there is already the requirement to form a corresponding smooth cut portion as high as possible, so that the corresponding cut surfaces can be used directly as roller tracks. It was therefore proposed to form the corresponding components of the carrier or the pendulum masses from sheet-metal made from cold-rolled strip material, since these allow, in principle, a suitable cutting quality. However, this has the disadvantage of relatively high costs. Furthermore, it is suggested that the sheet-metal thickness should be as high as possible, since this increases the surface area of the roller tracks. However, this not only results in an increase in the weight of the centrifugal pendulum, but also a more demanding production method, which must be implemented with additional measures. The corresponding sheets are often carburized beforehand in order to achieve a high case-hardening depth. This also leads to an increase in manufacturing costs.

SUMMARY

According to the disclosure, at least one of two roller tracks is formed partly or completely by an axially formed/projecting sheet-metal portion in such a way that a free edge of the axially formed sheet-metal portion faces away from the nearest pendulum mass. By forming the roller track(s) from a sheet-metal portion in this way, they are no longer formed directly by a cut surface, but by a lateral surface of the carrier or the pendulum mass. This reduces the need for post-processing of the actual cut surfaces. In addition, the roller tracks are designed to be wide, so that they are even more wear-resistant.

In an example embodiment, the formed sheet-metal portion has an area curved by sheet-metal forming, with which a portion of the roller body can be brought into contact and over which the portion of the roller body may roll.

In an example embodiment, the sheet-metal portion partly or completely forms a bearing region of a through hole forming the roller track. The extent of the roller track can thus be determined individually by the sheet-metal portion.

In an example embodiment, the sheet-metal portion forms a radial inner side and/or a radial outer side of the bearing region. If both the inner side and the outer side of the bearing region are formed by the sheet-metal portion, a sum of the length of the sheet-metal portion on the radial outer side and the length of the sheet-metal portion on the radial inner side (each length corresponds to an axial extension along a rolling axis of the roller body) may be smaller than a width (width corresponds to radial width) of the through hole.

In an example embodiment, the carrier has two flange elements, and both flange elements have a (first) roller track for each roller body which accommodates said roller body and is formed by an axially formed sheet-metal portion. This further increases the available guiding/rolling surface.

The (respective) sheet-metal portion may be formed in such a way that it runs essentially perpendicularly to a radially extending disk region of the carrier or the pendulum mass. Substantially perpendicular to the disk region means an angle of 90°±10° relative to the disk region.

In an example embodiment, a transition between the sheet-metal portion and the disk region is formed in such a way that a radius formed by this transition is less than half the material thickness of the disk region. This radius may be formed in a calibration process in an embossing tool sequence.

If the at least one roller body has a conical support surface, by means of which it is axially supported on the carrier or the pendulum mass, e.g., in the area of the formed sheet-metal portion curved by sheet-metal forming, its centering is further optimized.

In an example embodiment, the (second) roller track of the pendulum mass is longer than the (first) roller track of the carrier. This results in long rolling surfaces for the roller bodies.

If the roller track of the carrier and/or the roller track of the pendulum mass is case-hardened, the robustness is further increased.

Furthermore, the present disclosure relates to a torque transmission device, e.g., in the form of a clutch, for a motor vehicle drivetrain, having a centrifugal pendulum according to at least one of the embodiments described above and a clutch disk connected to the carrier of the centrifugal pendulum.

In other words, according to the disclosure, a centrifugal pendulum with pultruded/projected roller tracks is realized. In order to reduce wear on a centrifugal pendulum, e.g., in a two-flange design attached to a clutch disc, it is proposed that the track of the pendulum mass and/or the flange or flanges includes the formed surface of a metal sheet.

BRIEF DESCRIPTION OF THE DRAWINGS

The disclosure is now explained in more detail below with reference to figures, in which context various exemplary embodiments are also shown.

In the figures.

DETAILED DESCRIPTION

The figures are merely schematic in nature and are therefore intended solely for the purpose of understanding the disclosure. The same elements are provided with the same reference symbols.

Figure 11:
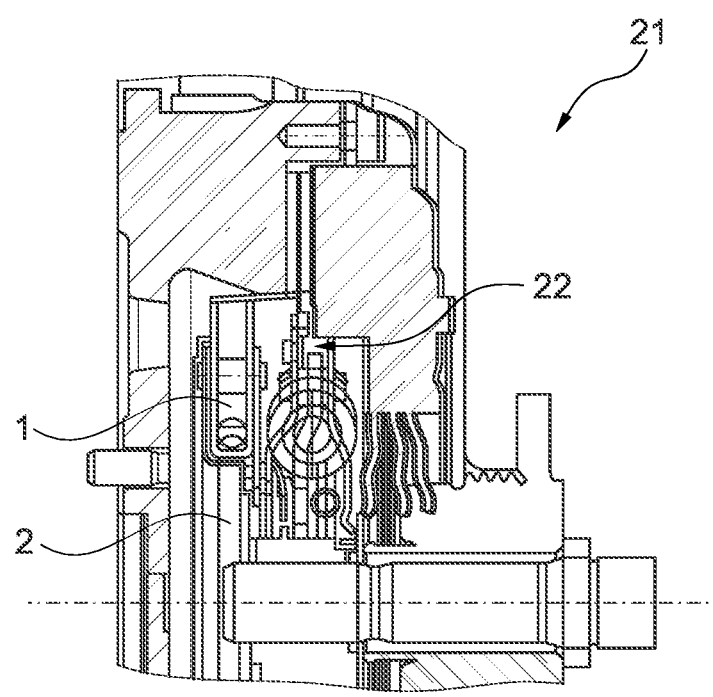
FIG. 11 shows a longitudinal sectional view of a torque transmission device, in which the centrifugal pendulum of FIGS. 1 to 5 can be used.

FIG. 11 illustrates an example area of application of a centrifugal pendulum 1 according to the disclosure, which is described in more detail below. The centrifugal pendulum 1 is shown schematically in this FIG. 11; its more detailed design is then shown in FIGS. 1 to 10. In FIG. 11, the centrifugal pendulum 1 is attached in a rotationally fixed manner to a clutch disk 22 of a torque transmission device 21. The torque transmission device 21 is implemented as a clutch, namely a friction clutch. The centrifugal pendulum 1 is typically used to absorb a torsional vibration in a drivetrain of a motor vehicle and may be used together with the torque transmission device 21 between an internal combustion engine and a transmission.

Figure 1:
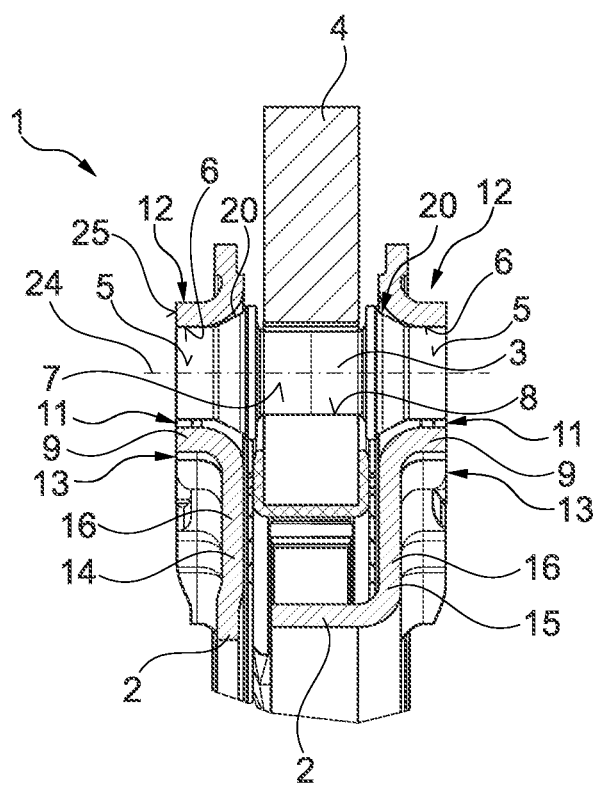
FIG. 1 shows a detailed view of a centrifugal pendulum according to the disclosure, sectioned in the longitudinal direction, according to a first embodiment, wherein a roller body mounted in roller tracks of a carrier and a pendulum mass is illustrated.
Figure 2:
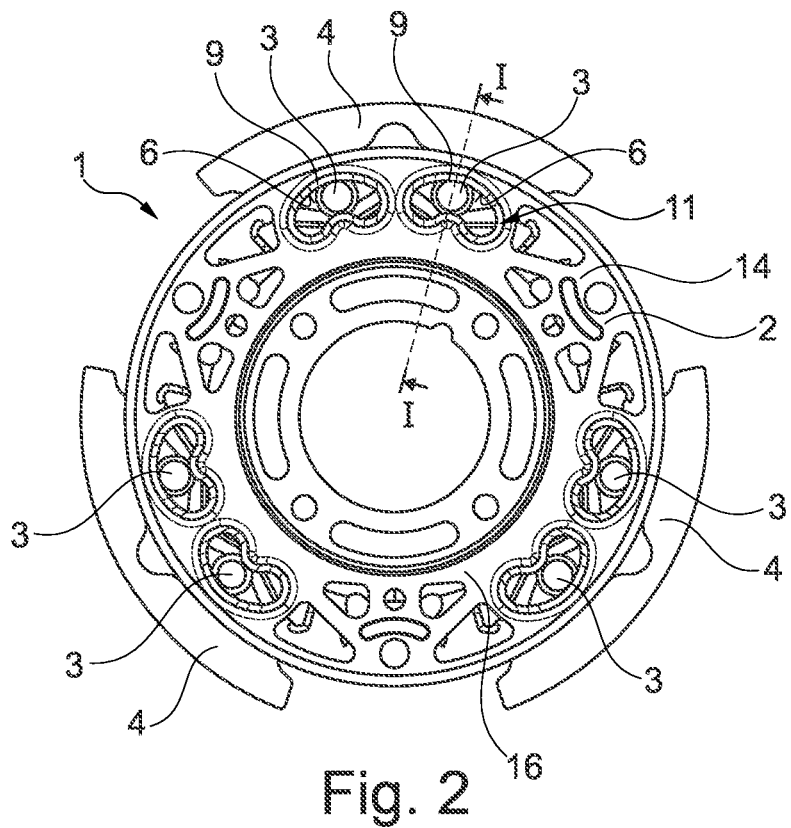
FIG. 2 shows a front view of a centrifugal pendulum according to the disclosure according to FIG. 1 with a cut line I-I characterizing the longitudinal section according to FIG. 1.
Figure 3:
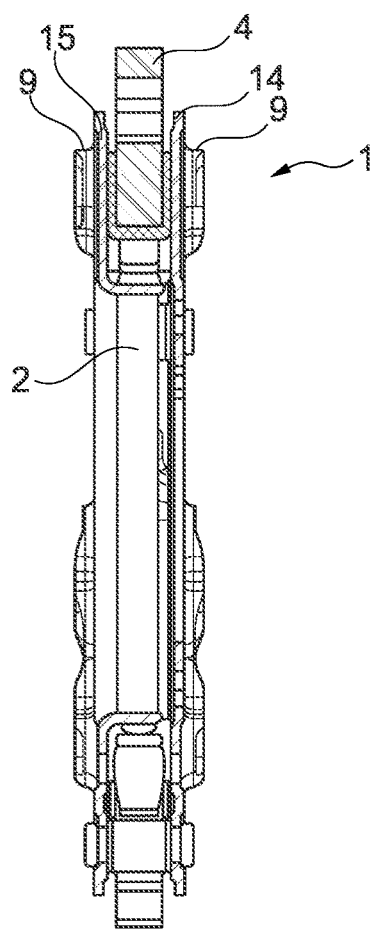
FIG. 3 shows a longitudinal section of the centrifugal pendulum as a full section view.
Figure 4:
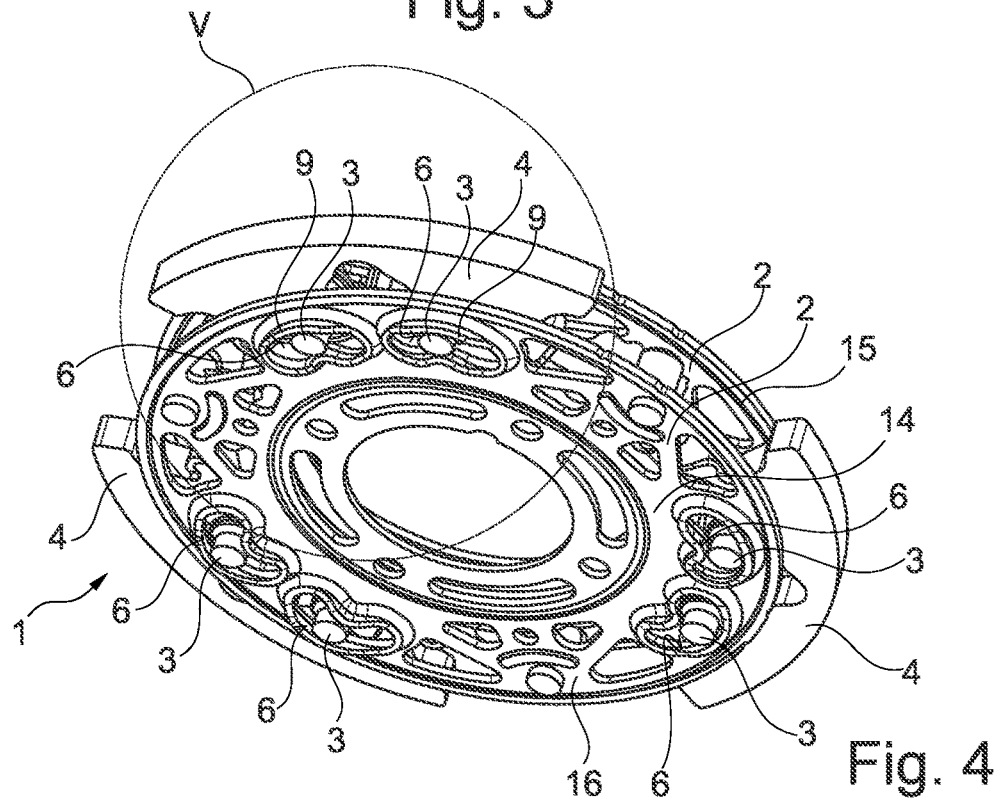
FIG. 4 shows a perspective view of a centrifugal pendulum according to FIGS. 1 to 3, wherein multiple sheet-metal portions of a flange element of the centrifugal pendulum can be seen, each forming a roller track.

The centrifugal pendulum 1 has a carrier 2, as shown in FIGS. 1 to 3 in connection with a first exemplary embodiment. The carrier 2 is designed in several parts. The carrier 2 has two flange elements 14, 15, wherein each of which forms a first roller track 6 for a roller body 3. According to FIG. 2, the flange elements 14 and 15 form multiple first roller tracks 6 distributed in the circumferential direction. Each first roller track 6 of the first flange element 14 is aligned with a first roller track 6 of the second flange element 15 axially/in the axial direction (i.e., along a rolling axis 24 of the roller body 3). The respective first roller track 6 runs in the circumferential direction of the flange element 14, 15 essentially in the shape of a kidney and is formed by an axial through hole 11. In each first roller track 6 of a flange element 14, 15, the roller body 3 runs with a first rolling region S.

A pendulum mass 4 is accommodated axially between the regions of the flange elements 14,15 forming the first roller tracks 6, which is guided in its pendulum/pivoting movement by means of the roller bodies 3 relative to the carrier 2. For this purpose, the pendulum mass 4 has a second roller track 8. The roller body 3 is accommodated in its axial region between the first roller tracks 6 to form a second rolling region 7 in this second roller track 8. The pendulum mass 4 is thus guided in a pivotable manner via the roller bodies 3 and by their inclusion in the roller tracks 6, 8 in the centrifugal force field during operation of the torque transmission device 21. FIG. 2 also shows that there are two roller bodies 3 for each pendulum mass 4, and these two roller bodies 3 assigned to a pendulum mass 4 run in a connected first roller track 6 of the pendulum mass 4. Typically, multiple pendulum masses 4, here three, distributed in the circumferential direction are accommodated on the carrier 2 in a pivotable manner in this way.

According to the disclosure, each of the first roller tracks 6 is formed by an axially folded/formed/projected sheet-metal portion 9 of the flange elements 14, 15 in such a way that a free edge or cut edge of the axially formed sheet-metal portion 9 faces away from the nearest pendulum mass 4. This is illustrated with the aid of the various FIGS. 1 to 9 in relation to the first embodiment. The two flange elements 14, 15 made of sheet-metal are therefore provided in the same way in the area of their first roller tracks 6 with multiple axially formed sheet-metal portions 9, which directly form the first roller track 6, wherein the free or cut edges of the formed sheet-metal portions 9 of the two flange members 14, 15 face away from each other.

Figure 9:
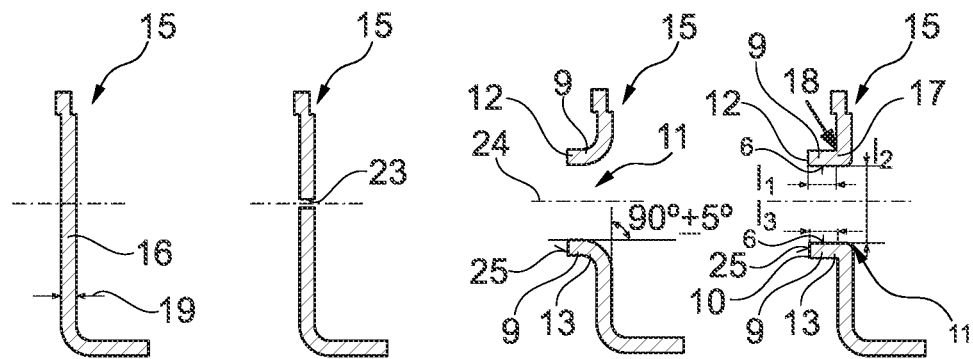
FIG. 9 shows a sequence of images to show a production process of a roller track implemented in the flange element according to FIG. 7, wherein the four partial illustrations show the different manufacturing steps.
Figure 10:
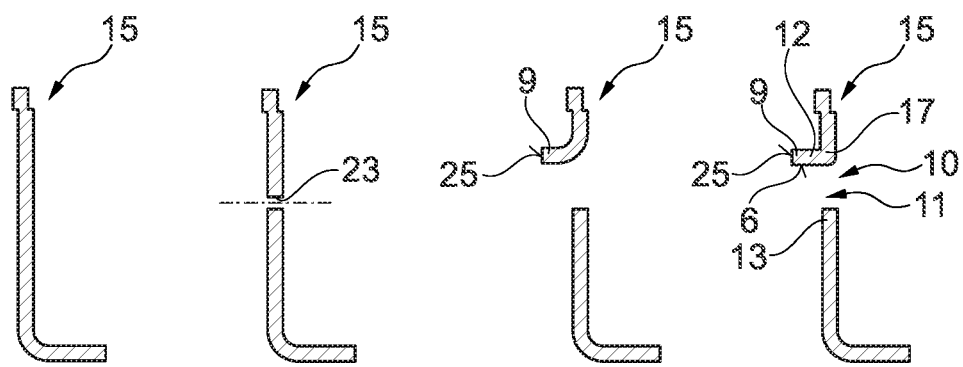
FIG. 10 shows a sequence of images to show the production of a flange element according to a second embodiment, in which only a radial outer side of a roller track is provided with the axially projecting sheet-metal portion.

This forming process is shown in detail in connection with FIG. 9 by way of example using the second flange element 15, wherein this process obviously also applies to the first flange element 14. Accordingly, a sheet-metal/steel sheet, e.g., a hot strip, provided with a specific material thickness 19 is initially provided, which is then processed in such a way that the axially projecting sheet-metal portion 9 is formed. First, a small through hole 23 is formed (e.g., by punching or cutting). The sheet-metal portion 9 is then extended, i.e., axially deformed in such a way that a through hole 11 is formed, which forms the first roller track 6 at least on its radial outer side 12 and on a radial inner side 13. In a calibration process, the length of the sheet-metal portion 9 is increased again on the outer side 12 and on the inner side 13. This creates a radius 18 at a transition 17 between a radially extending disk region 16 of the second flange element 15 and the sheet-metal portion 9, which is less than half the material thickness 19.

In FIG. 9, it can also be seen that in the fully formed state according to the rightmost partial representation in section that the sum of the length/axial extent $I_1$ of the sheet-metal portion 9 on the radial outer side 12 and the length/axial extent $I_3$ of the sheet-metal portion 9 on the radial inner side 13 is smaller than the radial extent $I_2$ (/width) of the through hole 11 (also referred to as track opening).

Thus, on the respective flange element 14, 15, a one-piece sheet-metal portion 9 is formed in the form of a sheet-metal cup, which runs/projects in the axial direction. Its cut edge 25, previously machined by stamping or cutting, is thus axially aligned and thus radially spaced/not in frictional contact with the roller body 3 and faces away from the closest pendulum mass 4 or the pendulum mass 4 to be guided. In particular, the formed sheet-metal portion has an area curved by sheet-metal forming, with which a portion of the roller body can be brought into contact and over which the portion of the roller body may roll.

FIG. 1 also makes it clear that the roller body 3 has a conically formed support surface 20 in an area between each first roller track 6 and the pendulum mass 4, which rests axially on a flange element 14, 15, e.g., in the area of the respective formed sheet-metal portion 9 that is curved as a result of sheet-metal forming, and thus (axially) centers the roller body 3 in the axial space between the flange elements 14, 15.

In addition, it can be seen that each first roller track 6 has a smaller length/axially shorter and thus forms a smaller contact surface towards the roller body 3 than the second roller track 8.

Furthermore, the respective first and second roller track 6, 8 is case-hardened.

Figure 5:
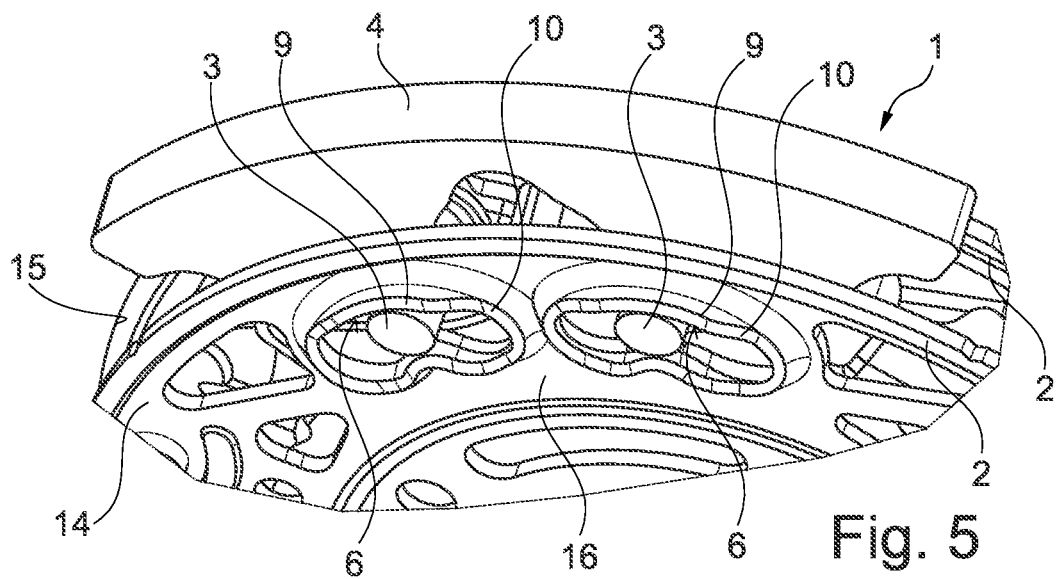
FIG. 5 shows a detailed view of the region marked "V" in FIG. 4.
Figure 6:
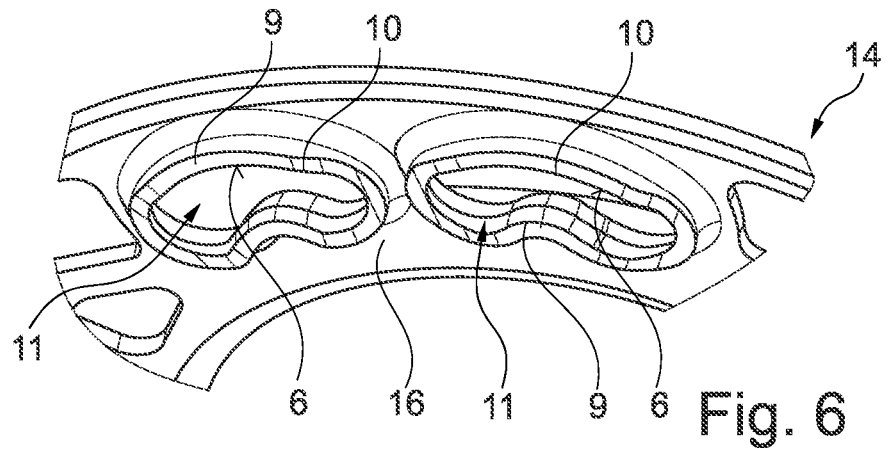
FIG. 6 shows a detailed view of the area of the flange element having the sheet-metal portions according to FIG. 5.
Figures 7, 8A, 8B:
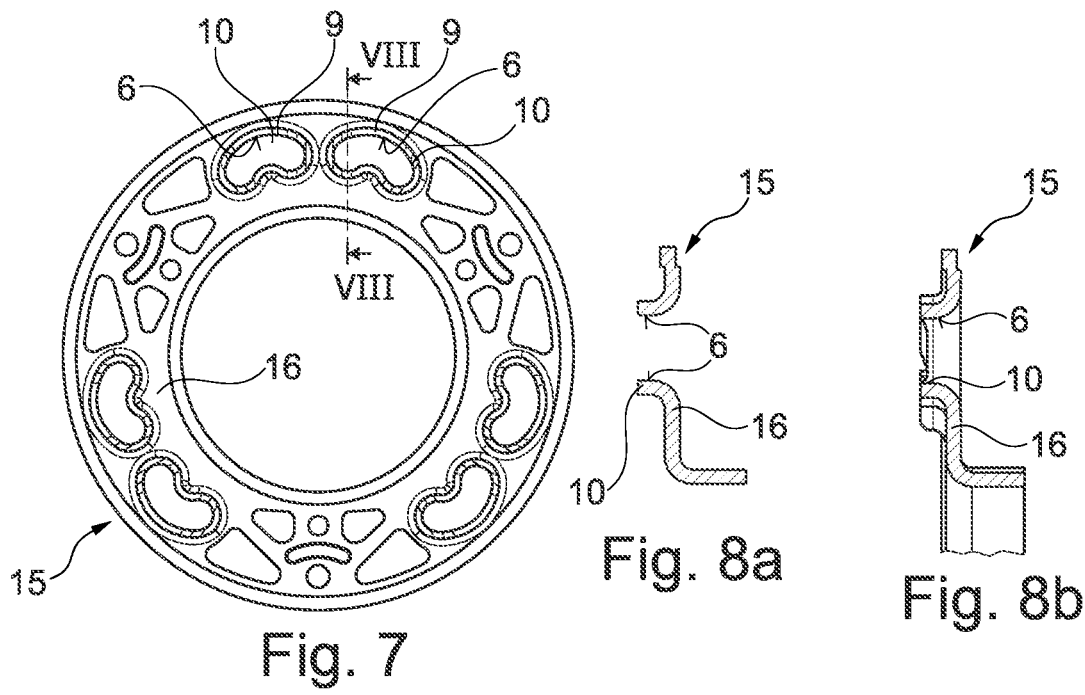
FIG. 7 shows a front view of a flange element used in the centrifugal pendulum of FIG. 1, FIGS. 8a and 8b show two longitudinal sectional views (with and without peripheral lines) of the flange element according to FIG. 7 along the cut line marked VIII-VIII in FIG. 7.

As can be seen in FIG. 5, this sheet-metal portion 9 may run around the entire circumference of the bearing region 10 forming the through hole 11. Alternatively, as illustrated in connection with FIG. 10, it is, in principle, also possible to provide only a peripheral area of this through hole 11/this bearing region 10 with the sheet-metal portion 9, then, for example, the area towards the radial outer side 12.

In this context, for the sake of completeness, it should also be mentioned that in further embodiments, the pendulum mass 4 is alternatively or additionally implemented with such a sheet-metal portion 9. The pendulum mass 4 is then also formed completely from sheet-metal/sheet steel, e.g., a hot strip.

In other words, the disclosure includes using the sheet-metal surface as a roller track 6 (instead of the cutting edge 25). The sheet-metal surface essentially has qualities whereby the measures change as follows: There is no need for a narrow cutting clearance in the tool, since the quality of the cutting edge is no longer important. The metal sheets (14, 15, 4) may be formed from a hot strip. The sheet thickness can be selected to be thinner, since the track width is no longer dependent on the sheet thickness. There is no need to pre-carburize the sheets, as the increase in the rolling surface reduces the strength requirements.

The disclosure thus relates to the following points:
1) A centrifugal pendulum 1 includes rollers 3 and formed from a sheet-metal carrier 2 and pendulum masses 4, wherein the track 6, 8 of the pendulum mass 4 or the carrier 2 includes the formed surface of the sheet metal.
2) A centrifugal pendulum 1 includes rollers 3 and formed from a sheet-metal carrier 2 and pendulum masses 4, wherein the sheet-metal cut edge 25 has no contact with the roller 3 and is therefore not a functional surface.
3) The centrifugal pendulum 1 according to point 1 or 2, wherein the tracks 6, 8 are formed from the bent sheet-metal part, which was originally in the region of the track.
4) The centrifugal pendulum 1 according to point 3, wherein the tracks 6, 8 are bent at an angle of 90°±10° to the rest of the part.
5) The centrifugal pendulum 1 according to point 3, wherein the tracks 6, 8 are calibrated in an embossing tool sequence. As a result, the material in the region of the corner is displaced, the radius 18 is therefore less than half the material thickness 19.
6) The centrifugal pendulum 1 according to point 4, wherein the rollers 3 have a conicity 20 adapted to the track projection angle. In this way, self-centering is achieved.
7) The centrifugal pendulum 1 according to point 3, wherein the track 6, 8 has a larger area in the center than at the sides. As a result, the center area with the highest rolling load is protected against excessive pressure.
8) The centrifugal pendulum 1 according to point 3, wherein the sum of the upper and lower axial extent of the track 6, 8 is smaller than the track opening ($l_1 + l_3 < l_2$ according to FIG. 9).
9) The centrifugal pendulum 1 according to point 3, where only the upper side of the track 6, 8 is bent. The roller 3 does not roll on the lower side and therefore does not need a curved track at this point.
10) The centrifugal pendulum 1 according to point 3, wherein the track 6, 8 is case-hardened.

REFERENCE NUMERALS

1 Centrifugal pendulum
2 Carrier
3 Roller body
4 Pendulum mass
5 First rolling region
6 First roller track
7 Second rolling region
8 Second roller track
9 Sheet-metal portion
10 Bearing region
11 Through hole
12 Outer side
13 Inner side
14 First flange element
15 Second flange element
16 Disk region
17 Transition
18 Radius
19 Material thickness
20 Support surface
21 Torque transmission device
22 Clutch disk
23 Hole
24 Rolling axis
25 Cut edge

The invention claimed is:

1. A centrifugal pendulum for a motor vehicle drivetrain, comprising a carrier and a pendulum mass, which is mounted for pivoting relative to the carrier by means of at least one roller body, wherein a first rolling region of the at least one roller body is accommodated in a roller track of the carrier and a second rolling region of the at least one roller body is accommodated in a roller track of the pendulum mass, wherein at least one of the two roller tracks is formed partly or completely by an axially formed sheet-metal portion in such a way that a free edge of the axially formed sheet-metal portion faces away from the nearest pendulum mass; wherein the formed sheet-metal portion has an area curved by sheet-metal forming, with which a portion of the roller body can be brought into contact and over which the portion of the roller body rolls.

2. The centrifugal pendulum according to claim 1, wherein the sheet-metal portion partly or completely forms a bearing region of a through hole forming the roller track.

3. The centrifugal pendulum according to claim 2, wherein the sheet-metal portion forms a radial outer side or a radial inner side of the bearing region.

4. The centrifugal pendulum H according to one of claim 1, wherein the carrier has two flange elements, wherein both flange elements have a roller track for each roller body which accommodates said roller body and is formed by an axially formed sheet-metal portion.

5. The centrifugal pendulum according to claim 1, wherein the free edges of the formed sheet-metal portions of the two flange elements face away from one another.

6. The centrifugal pendulum according to claim 1, wherein the sheet-metal portion is formed in such a way that it runs essentially perpendicularly to a radially extending disk region of the carrier or the pendulum mass.

7. The centrifugal pendulum according to claim 6, wherein a transition between the sheet-metal portion and the disk region is formed in such a way that a radius formed by this transition is less than half the material thickness of the disk region.

8. The centrifugal pendulum according to claim 1, wherein the at least one roller body has a conical support surface by means of which it is axially supported on the carrier or the pendulum mass, in the area of the formed sheet-metal portion that is curved by sheet-metal forming.

9. The centrifugal pendulum according to claim 1, wherein the roller track of the pendulum mass is longer than the roller track of the carrier.

10. The centrifugal pendulum according to claim 1, wherein the roller track of the carrier or the roller track of the pendulum mass is case-hardened.

11. A torque transmission device for a motor vehicle drivetrain, having the centrifugal pendulum according to one of claims 1 to 10 and a clutch disk connected to the carrier of the centrifugal pendulum.

12. A centrifugal pendulum for a motor vehicle drivetrain, comprising:
a carrier comprising a carrier roller track;
a pendulum mass, mounted for pivoting relative to the carrier, the pendulum mass comprising a pendulum mass roller track; and
a roller body comprising:
a first rolling region arranged in the carrier roller track; and
a second rolling region arranged in the pendulum mass roller track, wherein:
the carrier roller track is formed at least partially by an axially formed sheet-metal portion having a free edge; and
the free edge faces away from the pendulum mass, wherein;
the axially formed sheet-metal portion comprises an area curved by sheet-metal forming; and
a portion of the roller body rolls on the area curved by sheet-metal forming.

13. The centrifugal pendulum of claim 12, wherein the axially formed sheet-metal portion forms a bearing region of a through hole forming the carrier roller track.

14. The centrifugal pendulum of claim 12, wherein the axially formed sheet-metal portion forms a radial outer side or a radial inner side of the bearing region.

15. The centrifugal pendulum of claim 12, wherein:
the carrier comprises two flange elements;
each one of the two flange elements comprises a respective carrier roller track; and
the first rolling region is arranged in the respective carrier roller tracks.

16. The centrifugal pendulum of claim 15, wherein:
the respective carrier roller tracks comprise respective free edges; and
the respective free edges face away from one another.

17. The centrifugal pendulum of claim 12, wherein:
the carrier comprises a radially extending disk region; and
the axially formed sheet-metal portion is formed such that it runs perpendicular to the radially extending disk region.

18. The centrifugal pendulum of claim 17, wherein:
the radially extending disk region comprises a disk region thickness;
the carrier comprises a transition region between the axially formed sheet-metal portion and the radially extending disk region; and
a radius formed by the transition region is less than half of the disk region thickness.

* * * * *